May 14, 1974 F. BOSSE 3,810,811
APPARATUS FOR MAKING CARRIER BAGS HAVING PLASTIC HANDLES
ATTACHED TO THE MOUTHS THEREOF
Filed June 17, 1971 3 Sheets-Sheet 1
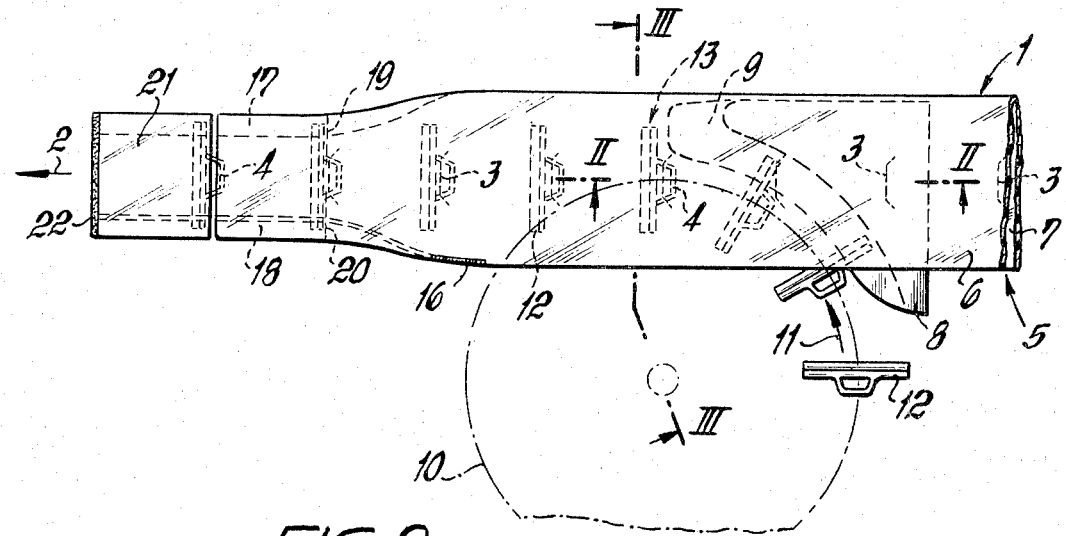
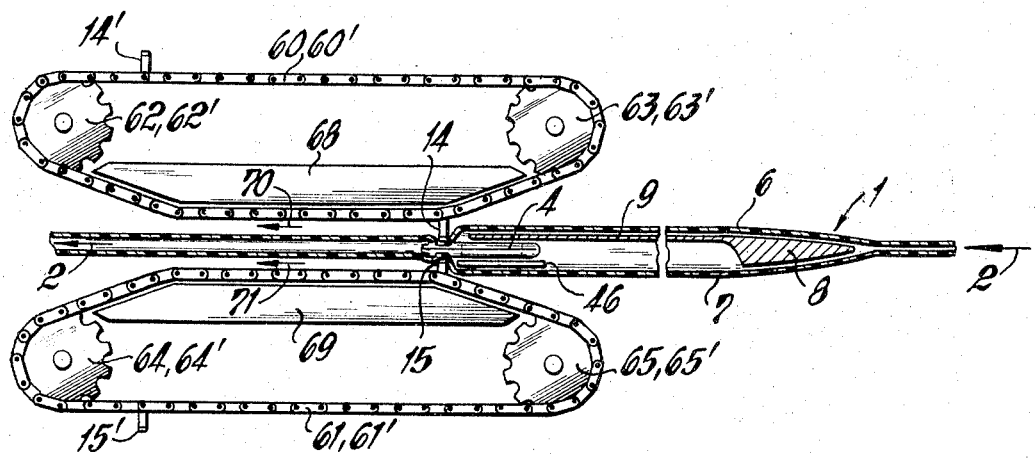
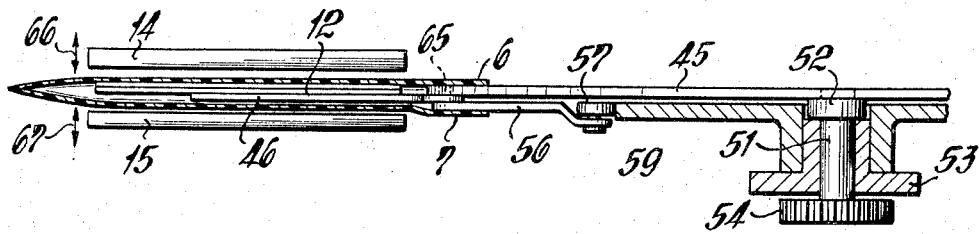
INVENTOR
Frank BOSSE
BY
Fleit, Gipple & Jacobson
his ATTORNEYS

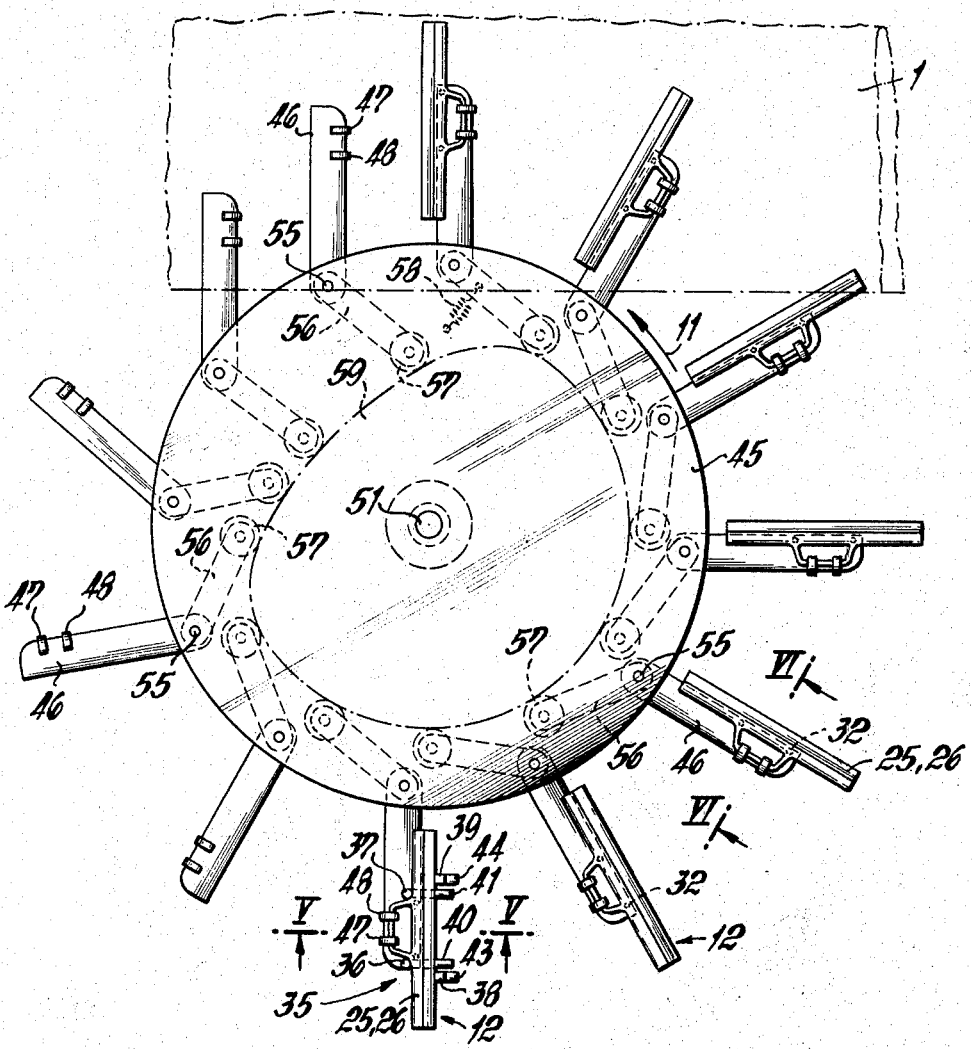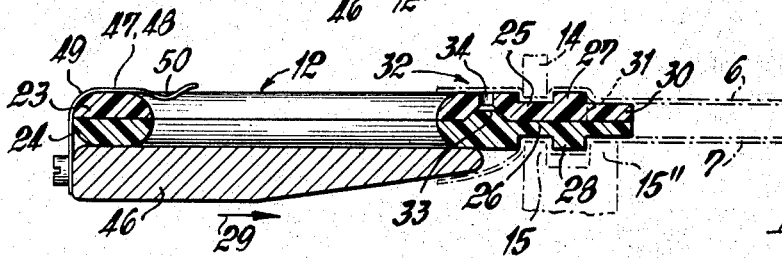

# United States Patent Office 3,810,811
Patented May 14, 1974

3,810,811
APPARATUS FOR MAKING CARRIER BAGS HAVING PLASTIC HANDLES ATTACHED TO THE MOUTHS THEREOF
Frank Bosse, Ibbenburen-Dorenthe, Germany, assignor to Windmoller & Holscher, Lengerich, Westphalia, Germany
Filed June 17, 1971, Ser. No. 154,071
Claims priority, application Germany, June 24, 1970,
P 20 31 305.7
Int. Cl. B32b *31/00*
U.S. Cl. 156—516      10 Claims

ABSTRACT OF THE DISCLOSURE

Apparatus for making carrier bags having plastic handles attached to the mouths thereof before bag lengths are severed from a tube of plastic bag material. The tube of bag material is flattened, open along one edge and fed lengthwise continuously as pairs of handles are successively inserted by rotary handle carriers between the plies of the tube through the open edge thereof to extend across the tube at intervals. Welding tools secure each pair of handles in position from outside the tube, whereafter the open tube edge is welded shut and the bag lengths are successively severed from the leading tube end along preformed scorelines passing through the positions of the attached handles. The bases of the bags are closed by welding after the severing operation. The pairs of handles are withdrawn from a magazine and inserted in the tube by carriers pivoted to a turntable. The welding tools move at the same speed as the tube during the welding operation and are supported by chains driven by a drive containing variable speed gearing.

---

The invention relates to a method and apparatus for making carrier bags.

To make plastic carrier bags which are each provided with a pair of form-retaining releasably interconnected handles at the mouth, it has long been known to inert the pairs of handles successively between the plies of a flattened split tube of bag material along the open edge of the split tube while the latter is stationary and to apply transverse separating weld seams to the tube by means of which the sides of the carrier bags are closed and the leading bag is severed from the tube. Thus, each carrier bag has a base formed by a folded edge of the tube material, an open mouth formed by the split edge of the tube material and welded sides formed by the transverse separating weld lines applied to the tube material. It will be clear that this method does not permit the construction of carrier bags having side pleats or gussets which give the bags a greater filling capacity and a better parallelepiped shape when filled. For such gusseted carrier bags with welded on pairs of handles it is necessary to prefabricate the gusseted bags, insert the pairs of handles by hand and weld them individually to each bag. Such a manual process is so costly by modern standards in comparison with an automatic process, wherein an intermittently moved tube of bag material has the handles successively welded to it during the standstill periods, that despite the demand for gusseted carrier bags, practically none are presently being made and marketed.

The invention aims to provide a method and apparatus which permits the continuous and fully mechanized production of carrier bags whether or not these are gusseted by forming corresponding side pleats or gussets in the tube of bag material before the carrier bags are severed from it.

According to the invention, there is provided a method of making carrier bags which are each provided with a weld seam at the base and with a pair of form-retaining handles at the mouth, each handle comprising a hand grip projecting from a supporting strip to define a hand hole therewith, wherein a flattened tube of continuously longitudinally fed thermoplastic bag material which is open along one longitudinal edge is provided at intervals corresponding to the lengths of the bags to be formed with transverse scorelines. The transverse scorelines stop short of the tube edges and extend through both superposed plies of the tube. The plies are spread apart from the open edge of the tube, the handles are inserted in successive pairs between the plies from the open edge of the tube to assume positions at which the supporting strips thereof extend transversely of the tube and the hand grips of each pair are located adjacent successive scorelines. The plies are pressed against and welded to the supporting strips from outside the tube as the latter is continued to be fed, the open edge of the tube is welded shut, the scorelines are extended to the longitudinal edges of the tube by additional scoring, and bag lengths, each possessing a pair of said handles at one end, are successively torn from the leading portion of the tube along the scorelines and provided with a weld seam along the opposite end.

Since the pairs of handles have their supporting strips disposed in the central region of the tube transversely to the direction of movement thereof, it is readily possible to form side pleats or gussets in the tube after the open edge thereof has been welded shut but the method of the invention is just as suitable to make carrier bags without gussets.

If gusseted bags are being made, it is advantageous if the handles of each pair are interconnected by means which permit their ready separation and reconnection because the application of gussets makes it necessary to separate the piles of the tube and thus also the handles temporarily. The separable interconnections may, for example, be in the form of conical studs and complementary sockets the primary function of which is to facilitate manipulation of the handles during their application to the flattened tubular bag material in pairs. It is therefore not absolutely essential that the handles be reconnectable after they have been welded to the bag material.

The invention also extends to an apparatus for applying and welding pairs of plastics handles to the inside of a continuously fed flattened tube of bag material in the performance of the above-mentioned method. The tube is open along one longitudinal edge thereof and each handle comprises a hand grip projecting from a supporting strip to define a hand hole therewith. A plurality of carrier elements, each for one pair of handles, is mounted in the medial plane of the tube for continuous movement from a handle receiving station outside the region of the tube to between the superposed plies of the tube and back again. The carrier elements are adapted to successively insert pairs of handles between the piles and release them at intervals along the tube with the supporting strips disposed transversely of the tube. Welding tools are provided for engaging the successive inserted pairs of handles from outside the tube as they are released by the carrier elements and for welding tube plies to the handles, the welding tools being adapted to move at the same speed as the tube while they are engaging the handles. The supporting strip of each handle is preferably provided, upstream of the weld connection to the associated tube ply as viewed in the direction of handle movement, with a ridge for positive engagement by one of the welding tools.

The carrier elements may be evenly distributed about the periphery of a rotary supporting member for moving them in a circle so that the circumferential spacing of the pairs of handles carried thereby is somewhat smaller than the shortest length of bag to be made, with the rotational speed of the supporting member being selected so that one pair of handles is brought to the welding position for each bag length. In this way the mid-point of each handle will have a speed which, in accordance with the spacings of the handles, is less than the speed of the tube. This speed difference ensures that when the welding tools are moving at the same speed as the tube they can withdraw the pairs of handles from the carrier elements. The longer the bag lengths being made, the greater will be the speed difference between the approaching handles and the welding tools. If bag lengths are being made in excess of twice the shortest possible bag length that can be made, then it is preferable to double the rotary speed of the supporting member for the carrier elements and to make every alternate carrier element inoperative. For this purpose the total number of carrier elements must be an even number.

The carrier elements are preferably pivotable with respect to the supporting member about axes parallel to the rotary axis of the supporting member and their pivotal movement is controlled by a stationary cam track so that each carrier element remains parallel to itself as it is withdrawn from between the tube plies by the rotating supporting member. If the carrier elements were to have a fixed disposition with respect to the supporting member instead of remaining parallel to themselves (substantially at right-angles to the tube) as they are being withdrawn from the tube, the intervals between successively applied pairs of handles along the tube and hence the shortest possible bag length would have to be unduly large to prevent each carrier element from interfering with a previously applied pair of handles that is already being held to the tube by the welding tool.

In one form of the invention, the carrier elements are adapted to withdraw pairs of handles from the underside of a handle magazine at the handle receiving station. The base of the magazine is apertured for the passage therethrough of handle-engaging means on the carrier elements and the front of the magazine contains a slot permitting the passage of one pair of handles at a time. The pairs of handles are supported in the magazine by two bars on either side of the hand grips, the bars carrying flat rails at their lower ends. The rails extend parallel to the plane of movement of the carrier elements and point in their direction of movement. The handle engaging means on the carrier elements are in the form of leaf springs pointing in the direction of movement of the carrier elements, each leaf spring comprising a horizontal portion spaced from the top of the carrier element so that a pair of handles can be lightly clamped by the leaf spring. A retaining spring is provided adjacent the slot of the magazine, the force of the retaining spring being slightly greater than that of the leaf springs so that each pair of handles engages under the leaf springs before it is completely withdrawn from the magazine. The leaf springs should be sufficiently wide to ensure that the handles are held straight.

The welding tools for engaging the tube and successive pairs of handles positioned therebetween are moved parallel to the tube and at the same speed as the tube during the welding operation. This is preferably accomplished by the following construction. The welding tools comprise at least one pair of welding beams, each secured to a pair of endless chains, and variable-speed gearing is provided in a drive for the chains to adapt the welding beam speed during the welding operation to different speeds of the tubing that become necessary when making different bag lengths.

Suitable variable-speed gearing is describd in German specification No. 1,185,629. It comprises differential gearing comprising a pivotable planet carrier which is pivoted by a two-armed lever pivoted at a fixed point, one arm of the lever carrying a cam follower roller for a rotary cam plate and the other arm being hinged to the planet carrier at a point spaced from the pivotal axis of the planet carrier. Such variable speed gearing is preferably modified for the purpose of the present invention so as to permit adjustment of the welding tool speed. More particularly, the arm hinged to the planet carrier comprises a coupling member which is attached to the planet carrier and an arcuate adjusting member which can swing about the fixed pivot point of the two-armed lever, is fixed to the arm that carries the cam follower and has its center of curvature at the point where the coupling member is hinged to the planet carrier, the coupling member being attachable to the arcuate member at different positions. By means of this modification, which is applicable to other forms of variable speed gearing, a single rotary cam plate will be sufficient to suit the entire range of bag lengths simply by altering the position at which the coupling member is attached to the arcuate member; adjustment of the lever lengths brings about no basic change in the position of the planet carrier as would be the case if the adjusting member were to be straight.

If use is made of a plurality of welding beams on each side of the flattened tube, it is preferable to provide a separate pair of chains with separate variable speed gearing for each beam. If there are $n$ welding beams, the welding period will be $n$ times as long as that obtainable for an apparatus that uses only one welding beam on each side of the tube and that moves at the same rotary speed. This is because a correspondingly longer inoperative period is available for the welding beam while it is returning along the thrust cam. Conversely, for the same welding period the rotary speed of the apparatus can be increased $n$ times to give a higher production speed.

An example of the invention will now be described with reference to the accompanying diagrammatic drawings in which:

FIG. 1 is a fragmentary plan view showing a flattened tube of bag material having pairs of handles applied to it;

FIG. 2 is an enlarged section on the line II—II in FIG. 1;

FIG. 3 is an enlarged section on the line III—III in FIG. 1;

FIG. 4 is a plan view of apparatus for applying the pairs of handles to the FIG. 1 tube;

FIG. 5 is a section on the line V—V in FIG. 4;

FIG. 6 is an enlarged section on the line VI—VI in FIG. 4; and

Figure 7:
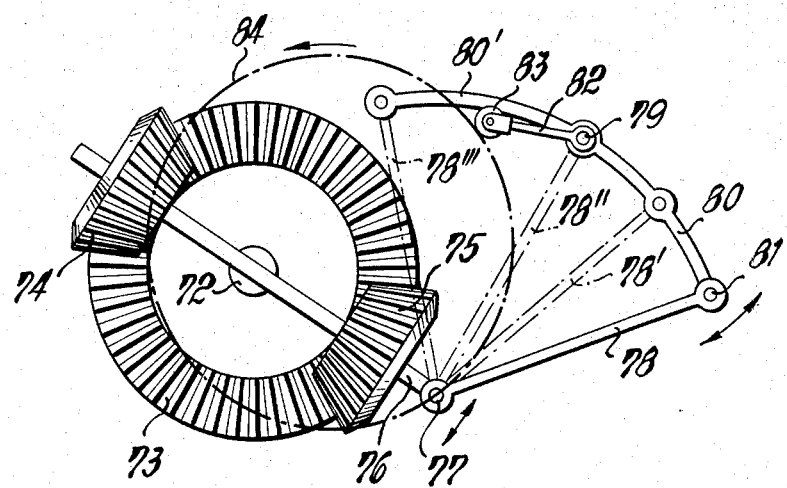
FIG. 7 is a diagrammatic representation of suitable variable speed gearing for use in conjunction with the FIG. 4 apparatus.

A flattened tube 1 (FIG. 1) of bag material is continuously fed in the direction of the arrow 2. The tube is open along a longitudinal edge generally indicated at 5. Lines 3 of perforations or other forms of scorelines are first of all formed at intervals along the tube in those positions which will later be overlapped by hand grips 4 of a pair 12 of handles. A spreader 8 temporarily separates the plies 6 and 7 of the flattened tube and carries an extension 9 for keeping the upper ply 6 elevated while the pair 12 of handles are introduced to between the plies along a circular path 10 in the direction of the arrow 11. As each pair of handles reaches the position 13, it is engaged by upper and lower welding beams 14, 15 (FIG. 2) which move at the same speed as the tube 1 and which weld successive pairs of the handles to the respective plies 6 and 7 of the tube. For each bag length defined between adjacent scorelines 3, one pair 12 of handles is applied at the position 13 and either a single piar of welding beams 14, 15 is used or another pair of welding beams 14', 15' alternates with the pair 14, 15 in securing the handles to the tube. The peripheral speed of the handles along the circular path 10 is chosen to be somewhat less than the speed of the tube 1 when the shortest possible bag length is being made. When making longer bag lengths, the speed difference between the pairs of handles and the tube is greater. When making twice the minimum possible bag length, the peripheral speed along the path 10 and the spacings between the individual handles can be doubled.

Downstream of where the pairs of handles are welded to the tube, the open edge of the latter is welded shut by a longitudinal seam 16 and, still further downstream, side pleats or gussets 17 and 18 are formed in the tube, whereafter the scorelines 3 which initially stopped short of the longitudinal edges of the tube are extended to the edges by additional scorelines 19 and 20. The leading bag length 21 can now be torn off the tube and accelerated away from it so that the hand grips 4 are pulled out from between the plies of the subsequent bag lengths. Each bag is completed by means of a seam 22 applied along its base.

FIG. 6 shows a pair 12 of handles 23 and 24 each comprising a hand grip (such as the hand grip 4 of FIG. 1) projecting from a supporting strip 25 or 26, respectively, to define a hand hole therewith. The supporting strips are each provided with a ridge 27 and 28, respectively, behind which the associated welding beams 14, 15 can engage positively and carry the pair of handles along with them in the direction of the arrow 29. The plies 6 and 7 of bag material are shown in chain-dotted lines in FIG. 6. As shown for the lower welding tool in FIG. 6, two welding beams 15, 15″ may be employed instead of just one welding beam 14. If only a single welding beam 14 is used in co-operation with a single welding beam 15, then the supporting strips 25, 26 of the handles can be shallower by omitting the portions 30 up to the chain-dotted line 31.

Alignment of the handles 23, 24 of each pair is effected by means of two pin and socket connections 32. Each pin and socket connection comprises a conical stud 33 on the supporting strip 26 engaged in a complementary socket 34 of the supporting strip 25. This interconnection of the two handles also facilitates withdrawal of the handles in pairs from a magazine 35 (FIGS. 4 and 5) but temporary separation of the welded-on handles is readily possible in FIG. 1 at the time the side folds or gussets 17, 18 are formed in the tube.

The magazine 35 for the handles 12 comprises two bars 36, 37 on one side of the supporting strips 25, 26 adjacent the hand grips, and two bars 38, 39 on the other side. The lower end of each bar 36, 37 carries a thin rail 40 or 41, respectively. The rails 40, 41 form the base of the magazine for supporting a stack of the pairs 12 of handles and, together with the lower ends of the bars 38, 39, they define an outlet slot 42 permitting one pair of handles to be withdrawn from the magazine at a time. Each pair of handles can be withdrawn through the slot only by overcoming the force of leaf springs 43, 44 attached to the bars 38, 39. The pairs of handles are pushed past these leaf springs by respective carriers 46 which are hingedly connected to a circular rotary supporting plate 45 and which carry leaf springs 47 and 48. As best shown in FIG. 6, the leaf springs 47, 48 are shaped so that, as each carrier 46 travels past the magazine 35 directly beneath the guide rails 40, 41, the free ends of the leaf springs 47, 48 penetrate between the lowermost pair 12′ of handles and the pair directly thereabove (this being facilitated by the rounded-off edges 49 of the hand grips of the handles) and so that a constriction 50 in the leaf springs causes the lowermost pair 12′ of handles to slide through the slot 42 in the magazine until it strikes the leaf springs 43, 44. The springs 43, 44 exert a greater resistance to the withdrawal of a pair of handles from the magazine than the springs 47, 48 due to engagement of the hand grips with the snap action past the constriction 50. Each pair of handles is therefore positively engaged with the springs 47, 48 of the associated carrier 46 and carried along by it along the circular path 10 in FIG. 1. The provision of two springs 47, 48 at a spacing from one another on each carrier element 46 facilitates the accurate radial positioning of the supporting strips 25, 26 of the handles with respect to the circle 10.

The supporting plate 45 is, as shown in FIGS. 3 and 4, fixed to a shaft 51. A collar 52 of the shaft rests on a thrust bearing 53 and the end of the shaft carries a pinion 54 which is rotated so that during the manufacture of each bag length the plate 45 is rotated by the equivalent of the pitch of the carrier elements 46 on the plate. The diameter of the plate 45 is such that the mid-points of the pairs of handles tracing the circular path 10 have an arcuate spacing from one another (as measured on the circle 10) which is somewhat less than the shortest possible bag lengths that can be made. When making minimum bag lengths, the handles will therefore have a speed which is somewhat less than the speed of the tube 1 and, since the welding beams 14, 15 move at the same speed as the tube, they will positively engage the more slowly moving pairs of handles 12 at the location of the ridges 27 of the supporting strips and pull the pairs of handles from beneath the respective leaf springs 47, 48.

After a pair of handles has been transferred from the carrier 46 to the welding beams, the carrier continues to be rotated by the plate 45 at a speed higher than that with which the tube is being fed so that the carrier is withdrawn through the open edge of the tube and eventually returned to the handle-receiving station constituted by the magazine 35. Because of the higher peripheral speeds of the carriers 46 during withdrawal from the tube, there is a danger that their free ends might interfere with the handles that have already been applied to the tube. Accordingly, each carrier 46 is attached to the plate 45 by a hinge 55 (see FIG. 3) and carries a lever 56 to which is roller 57 is rotatably mounted. Each lever 56 is biassed by a tension spring 58 (one of which is shown in FIG. 4) so that its roller 57 engages a cam disc 59. The cam disc 59 is shaped so that, as each carrier 46 leaves the tube of bag material, it remains parallel to itself and therefore avoids striking a handle on the tube.

The welding beams 14 and 15 are shown diagrammatically in FIG. 3. Their length corresponds to that of the supporting strips 25, 26 of the pairs 12 of handles. The welding beams are carried in known manner by respective pairs of chains 60, 60′ and 61, 61′. These chains pass over sprockets 62, 62′ to 65, 65′ and are driven so that for each bag length a pair of welding beams 14, 15 will meet a pair 12 of handles to engage the latter and weld them to the tube. To effect movement of the welding beams towards and away from the tube in the direction of the arrows 66 and 67 before and after the welding operation, the runs of the chains adjacent the tube are passed over suitably shaped guide rails 68 and 69. Since the speed of the welding beams when moving in the direction of the arrows 70 and 71 must be the same as that of the tube so that for each bag length a pair of handles is engaged by a pair of welding beams, the total length of each chain must be equal to the bag length being made and the chains must be driven at the same speed as the tube. If, as is shown in FIG. 2, a second pair of welding beams 14′, 15′ is provided, the chains must be twice as long, and so on. Such an apparatus can therefore be used only in the production of constant bag lengths unless the chains are replaced each time a different bag length is to be made, which would involve untenable constructional and labor costs and interruptions in production.

For this reason the drive for the chains carrying the welding beams includes variable speed gearing which is basically described in German patent specification No. 1,185,629. It comprises differential gearing having a pivotable planet carrier which is pivoted under the action of a rotary cam operating through a two-armed lever which is pivoted at a fixed point. One arm of the two-armed lever carries a cam follower roller which is spring-biassed into engagement with the cam which turns in sequence with the machine cycle. The other arm is hinged by a coupling member to the planet carrier at a point spaced from the pivotal axis of the planet carrier. As will hereinafter be described in more detail, it is a feature of the present invention that the connection of the coupling member to an arcuate adjusting member be adjustable to have a spacing from nought up to a maximum from the pivotal axis of the two-armed lever, preferably to both sides of the pivotal axis. By suitably setting this spacing of the connection from the pivotal axis, preferably with the aid of a scale which is graduated according to bag lengths, the speed of the chains during the welding operation is appropriately regulated. The rotary cam is so designed that for any bag length to which the chains are set the welding beams and the tube will move at the same speed. It is preferred that the length of the chains be equal to a medium bag length. When actually producing bags having this medium length, the point of connection of the coupling member to the arcuate adjusting member will coincide with the pivot point of the two-armed lever and thus there will be no acceleration or deceleration of the chains. For larger or smaller bag lengths, the point of connection of the coupling member will be displaced to the right or left of the pivot point of the two-armed lever. If the chains are given a length equal to the maximum or minium bag length that can be made, then the chain speed during the welding operation can only be increased or decreased, respectively, from a basic speed by moving the point of connection of the coupling member to only one side of the pivot point of the two-armed lever.

Since a uniform speed differing from the basic speed can be achieved only by means of a constant rise or fall in the cam which is instrumental in pivoting the planet carrier, this speed differing from the basic speed is attainable only along a sector of one revolution of the cam because the appropriately swung two-armed lever must be swung back again along another sector of the revolution of the cam. Since the cam is driven in sequence with the operating cycle of the machine, the welding period is therefore restricted to a fraction of one operating cycle. However, it is clearly not possible to reduce the welding period at will and therefore the machine must not operate so fast that the minimum welding period cannot be attained within each operating cycle.

An increase in the period available for the welding operation during each machine cycle can, however, be achieved by providing a plurality of pairs of welding beams, each pair of welding beams being provided with its own pair of chains driven through variable speed gearing. In the same way as when several welding beams are provided on only one pair of chains, the pairs of welding beams will in this case alternate in coming into engagement with the pairs of handles that are being successively offered to the tube. If there are $n$ pairs of welding beams, each pair will therefore perform a welding operation on every $n$th bag length. There are thus $n$ operating cycles available for one complete movement of each pair of chains and the rotary cam in the variable speed gearing has its speed reduced to $1/n$. The proportion of the operating cycle available for the welding period is now $n$ times higher and in fact the welding period could even be longer than one machine cycle. The chains also have to be made $n$ times longer. This arrangement therefore makes it possible to maintain an optimum welding period so as to achieve efficient welding and yet to increase the speed of the machine by the factor $n$ and thereby correspondingly increase the output of the machine.

FIG. 7 diagrammatically illustrates the preferred form of variable speed gearing. It comprises differential bevel gearing 73 of which a planet carrier 76 for planet gears 74 and 75 is pivotable about a shaft 72. Hinged to a point 77 spaced from the shaft 72 there is a coupling member 76 the free end of which is hinged to an adjusting member 80, 80′ of a two-armed lever which is pivotable about a fixed point 79. The hinge connection between the coupling member 78 and the adjusting member 80, 80′ is shown at 81 but the coupling member can be hinged to different points to assume any one of the positions shown in chain-dotted lines at 78′, 78″ and 78‴. The adjusting member 80, 80′ may, as is illustrated, extend to both sides of its fixed pivot point 79 and is arcuate, its center of curvature coinciding with the hinge connection 77 of the coupling member 78 to the plant carrier 76. It is desirable, but not essential, to use the central position of the planet carrier 76 as a basis for determining the length of the coupling member 78. A single cam plate 84 can then be employed to cater for the entire range of bag lengths simply by changing the position of the hinge point 81 between the coupling member 78 and the adjusting member 80, 80′ because adjustment of the lever length at which the planet carrier is automatically moved to the starting position (where the spacing of the point 77 from the point 79 is equal to the length of the coupling member) does not bring about any basic adjustment in the planet carrier as would be the case with a straight adjusting member. The adjusting member 80, 80′ forms one arm of a two-arm lever; the other arm 82 is fixed to it and carries a cam follower roller 83 co-operating with the cam plate 84 which turns together with the shaft 72. Depending on whether the length of the chains is adapted to the medium, minimum or maximum bag length, both portions 80, 80′ of the adjusting member are required or only one of them. When making bags of the same length as the chains, the coupling member will be in the position 78″ at which it is hinged to the fixed pivot point 79 of the two-armed lever. The modified construction of FIG. 7 as compared with the variable speed gearing of German specification 1,185,629 permits different speeds to be set with just a single cam plate.

What is claimed is:

1. Apparatus for making carrier bags from a flattened tube of bag material having an opening along one longitudinal edge thereof, said carrier bags being provideed with a weld seam at the base and with a pair of form-retaining handles at the mouth, each handle comprising a supporting strip and a hand grip projecting therefrom, comprising means for moving said flattened tube relative to said apparatus, means for providing said flattened tube with transverse scorelines for receiving said hand grips, a plurality of carrier elements each having handle engaging means for engaging a pair of handles, said carrier elements being mounted in a plane extending between the plies of said flattened tube for continuous movement from a handle receiving station outside the region of said flattened tube to a position between said tube plies and back again, said carrier elements including means for successively inserting pairs of handles between said tube plies and releasing them at intervals along said flattened tube so that the supporting strips of said handles are disposed transversely of said flattened tube, said handle inserting means comprising a rotating supporting member with said carrier elements being connected thereto, said carrier elements being pivotable with respect to said supporting member about axes parallel to the rotary axis of the supporting member with their pivotal movement being controlled by a stationary cam track so that each carrier element remains parallel to itself as it is withdrawn from between the tube plies by the rotating supporting member, welding tools for engaging the successively inserted pairs of handles from outside said flattened tube as said pairs of handles are released by said carrier elements and for welding said tube plies to said handles, means for moving said welding tools at the same speed and in the same direction as said flattened tube while said welding tools are engaging said handles, welding means for closing said opening along one longitudinal edge of said flattened tube, and means for extending said scorelines to the longitudinal edges of said flattened tube by additional scoring and for successively tearing bags each possessing a pair of said handles at one end and having a weld seam along the opposite end from the leading portion of said flattened tube along said extended scorelines.

2. Apparatus according to claim 1, wherein the supporting strip of each handle is provided, upstream of the weld connection to the associated tube ply as viewed in the direction of handle movement, with a ridge for positive engagement by one of the welding tools.

3. Apparatus according to claim 1, wherein the carrier elements are evenly distributed about the periphery of a rotary supporting member for moving them in a circle so that the circumferential spacing of the pairs of handles carried thereby is somewhat smaller than the shortest length of bag to be made, the rotational speed of the supporting member being selected so that one pair of handles is brought to the welding position for each bag length.

4. Apparatus according to claim 1, wherein the carrier elements are adapted to withdraw pairs of handles from the underside of a handle magazine at the handle receiving station.

5. Apparatus according to claim 4, wherein the base of the magazine is apertured for the passage therethrough of handle engaging means on the carrier elements and wherein the front of the magazine defines a slot permitting the passage of one pair of handles at a time.

6. Apparatus according to claim 4, wherein the pairs of handles are supported in the magazine by two bars on either side of the hand grips, the bars carrying flat rails at their lower ends, which rails extend parallel to the plane of movement of the carrier elements and point in their direction of movement.

7. Apparatus according to claim 5, wherein the handle engaging means on the carrier elements are in the form of leaf springs pointing in the direction of movement of the carrier elements, each leaf spring comprising a horizontal portion spaced from the top of the carrier element so that a pair of handles can be lightly clamped by the leaf spring.

8. Apparatus according to claim 7, including a retaining spring adjacent the slot, the force of the retaining spring being slightly greater than that of the leaf springs.

9. Apparatus according to claim 1, wherein the welding tools comprise at least one pair of welding beams each secured to a pair of endless chains and variable speed gearing is provided in a drive for the chains to adapt the welding beam speed during the welding operation to different speeds of the tubing when making different bag lengths.

10. Apparatus according to claim 9 comprising a plurality of pairs of welding beams and a separate pair of chains with separate variable speed gearing for each beam.

References Cited

UNITED STATES PATENTS

| | | | |
|---|---|---|---|
| 3,511,735 | 12/1970 | Lindley | 156—516 |
| 3,334,784 | 8/1967 | Morrison | 24—277 X |
| 3,439,591 | 4/1969 | Class | 93—35 |
| 3,300,365 | 1/1967 | Roos | 156—583 |

ALFRED L. LEAVITT, Primary Examiner

D. A. SIMMONS, Assistant Examiner

U.S. Cl. X.R.

93—8 WA, 35 H; 156—522, 552, 567, 571, 264